Figure 1:
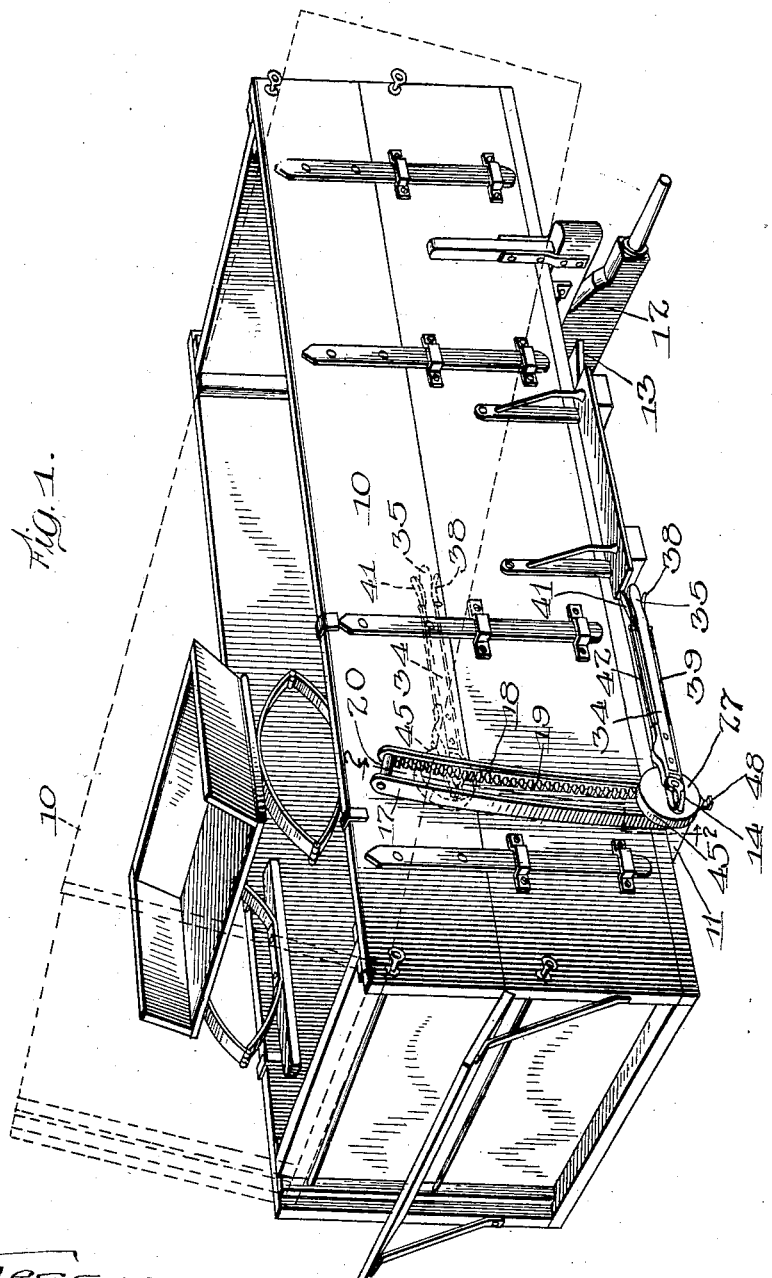

C. H. VAN DEUSEN.
DUMPING WAGON.
APPLICATION FILED OCT. 16, 1907.

898,533.

Patented Sept. 15, 1908.
3 SHEETS—SHEET 1.

Witnesses:
L. V. Domarus Jr.
Robert H. Weir

Inventor
Charles H. Van Deusen
by Buckley, Durand & Drury
his attorneys

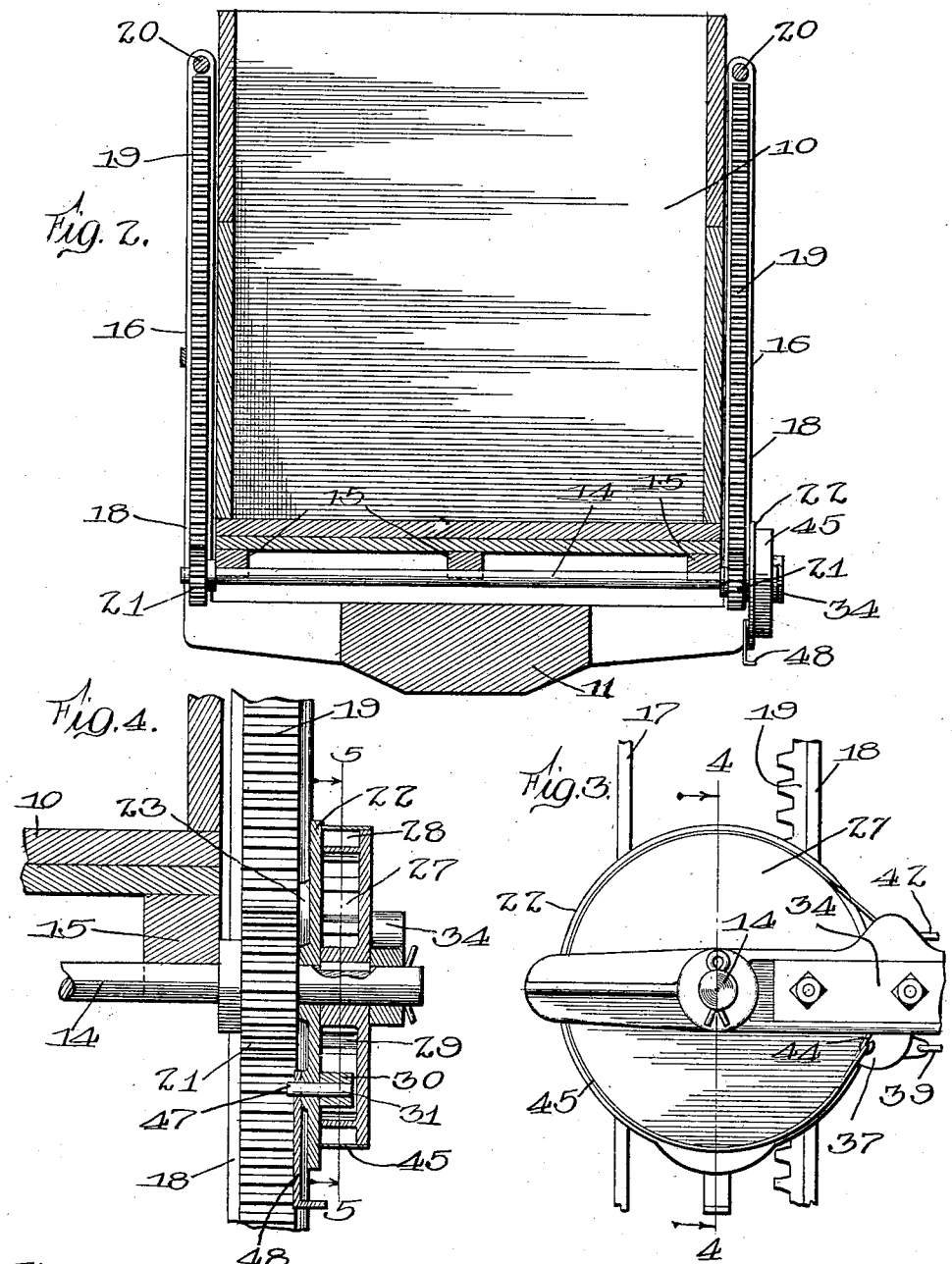

C. H. VAN DEUSEN.
DUMPING WAGON.
APPLICATION FILED OCT. 16, 1907.
898,533.
Patented Sept. 15, 1908.
3 SHEETS—SHEET 3.
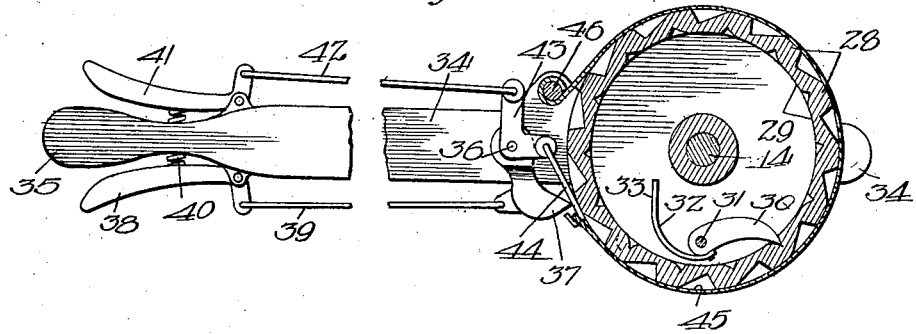
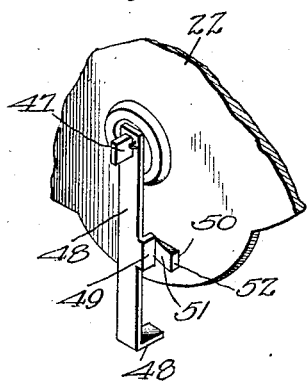
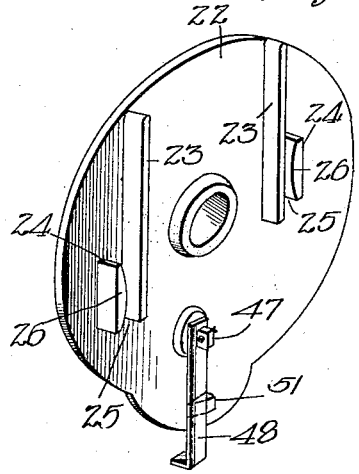
Witnesses:
Ira D. Perry
Robert N. Weir
Inventor:
Charlie H. Van Deusen
by Buckley Durand & Denny
his attorneys

UNITED STATES PATENT OFFICE.

CHARLES H. VAN DEUSEN, OF VERONA, ILLINOIS.

DUMPING-WAGON.

No. 898,533.   Specification of Letters Patent.   Patented Sept. 15, 1908.

Application filed October 16, 1907. Serial No. 397,649.

*To all whom it may concern:*

Be it known that I, CHARLES H. VAN DEUSEN, a citizen of the United States of America, and resident of Verona, Grundy county, Illinois, have invented a certain new and useful Improvement in Dumping-Wagons, of which the following is a specification.

My invention relates to improvements in dumping wagons, and has for its object the production of a device by means of which a wagon body may be elevated to a dumping position and at the same time locked against displacement.

A further object is the production of a device by means of which one end of the wagon box may be elevated to any desired degree in order to dump the contents of the wagon, while at the same time the wagon may be locked in any position required.

A further object is the production of a device by means of which the wagon body, after the load is dumped, may be returned to its normal position at any desired rate of speed.

A further object is the production of a device that can be readily attached to wagon bodies to facilitate the dumping of the contents thereof, and the return of the wagon box to its normal position.

A further object is the production of a device that may be cheaply constructed, and one that is least liable to disarrangement of the parts, while at the same time being one that is easy of operation.

These and such other objects as may hereinafter appear are attained by my device, embodiments of which are illustrated in the accompanying drawings, in which Figure 1 represents a perspective view of a wagon body equipped with my device, the dotted lines showing the wagon in raised position ready to dump the contents. Fig. 2 is a vertical cross section through the front bolster on the line 2—2 of Fig. 1, looking in the direction indicated by the arrows. Fig. 3 is an enlarged side elevation of a portion of Fig. 1, showing the elevating device. Fig. 4 is a sectional view on the line 4—4 of Fig. 3, looking in the direction indicated by the arrows. Fig. 5 is a sectional view on the line 5—5 of Fig. 4, looking in the direction indicated by the arrows. Fig. 6 is an enlarged perspective view of the inner face of the lifting mechanism, shown in Fig. 3. Fig. 7 is an enlarged perspective of a portion of Fig. 6, showing the tripping mechanism.

Like numerals of reference indicate like parts in the several figures of the drawings.

10 represents a wagon box resting on front bolsters 11 and rear bolsters 12. A cleat or bracket 13 is attached to the underside of the box to prevent the same from sliding back when elevated. A rod or axle 14 is located above the bolster 11, and on which the wagon body is seated through the medium of guides or lugs 15 partially surrounding the axle. The front bolster 11 terminates in pairs of upwardly extending guides 16—16 on either side of the wagon box. These guides, which are best shown in Fig. 3, comprise a plain strip or guide 17, and an opposite guide 18 having secured to its inner face a rack bar 19. The parts 17 and 18 are connected at the top by a pin or brace 20, and are thereby prevented from spreading apart. As more clearly shown in Fig. 1, these guides are preferably slightly curved, the radius of curvature being the distance between the front and rear bolsters. Keyed to the shaft or axle 14 are ratchet wheels 21—21 adapted to engage the rack bar 19. It will thus be seen that the turning of the axle 14 operates to cause the ratchet wheel or pinion 21 to rise in the rack bar 19, carrying with it the wagon body. A casting 22, preferably circular and shown in Fig. 6, is loosely journaled on the axle 14. This casting is adapted to engage the guide bars 17 and 18, and as a means of attaining this end the outer faces of the casting are provided with series of parallel lugs 23 on either side of the axle bar. Adjacent to each lug is a second bearing lug 24, each lug within which the guide bars 17 and 18 fit forming with the lugs 23 channels 25. The lugs 24 are preferably cast with a curved inner face 26, thereby reducing the friction between the guides and the lugs. Outside of this casting or covering 22 is provided a hollow ratchet wheel 27 rigidly keyed on the shaft 14. This ratchet wheel is provided with teeth 28 on its outer face, and with corresponding teeth 29 on its inner face, the purpose of which will be explained later. The casting 22 serves as a cover for the ratchet wheel 27, and is provided on its inner face with a dog 30 mounted on a pivot 31, to which is attached an ordinary leaf spring 32 abutting against a stop 33. The dog 30 is adapted to engage the teeth 29 on the inner periphery of the ratchet wheel 27. A lever 34 is loosely keyed on the outer end of the shaft outside of the ratchet wheel 27, terminating in a handle 35. On a pivot 36, secured to the lever 34, adjacent to the ratchet wheel 27, is loosely journaled a ratchet dog 37, adapted to engage the teeth 28 on the outer periphery of the wheel 27. A bell crank lever 38 is mounted on the handle 35, connected by a shaft 39 with the dog 37. A spring 40 tends to normally hold the dog 37 in engagement with the ratchet teeth 28. On the opposite side of the lever 34 is a second bell crank lever 41, connected by a rod 42 with a third bell crank lever 43 preferably secured to the pivot 36. To the other arm of the third bell crank lever, which may be termed the brake lever, is secured a rod 44 connected with a band brake 45 encircling the ratchet wheel 27. The opposite end of this band brake is secured to a post 46 mounted on the lever 34. The pivot 31, on which the dog 30 is mounted, is extended outwardly and squared or flattened, as shown at 47. Secured on this flattened end is a tripping lever 48, provided with a flange or lug 49. Secured on the face of the casting 22, adjacent to the position occupied by the lug 49, is a stop 50. The end portion 47 of the pivot is so arranged that when the tripping lever hangs freely in position, shown in Fig. 7, the dog 30 is in position to engage the teeth 29. When the tripping lever 48 is pressed to one side, the lug 49 passes up over the inclined face 51 of the stop and slips down against the side 52, thus locking the dog 30 out of engagement with the teeth.

Referring now to the operation of my device, ordinarily the lever 34 with its attached parts is off the shaft, and either fastened to the side of the wagon box in any desired manner, or carried on the seat, thus avoiding any danger of breaking or bending the lever or parts by contact with obstacles of any kind. When it is desired to dump the wagon, the lever being in place as shown in Fig. 1, the lever is worked up and down, the dog 37 sliding over the teeth 28 on the up-stroke and engaging the teeth on the down-stroke. The dog 30 also being in engagement with the teeth 29, the down-stroke revolves the axle 14, causing the shaft 14 and pinion 21 to mount upwardly in the rack 18, thus elevating the wagon box. This operation is continued until the box is elevated to the desired angle. After the load has been dumped, in order to lower the wagon to its original position, the tripping lever 48 is brought into engagement with the side 52 of the stop, thereby releasing the dog 30 from engagement with the teeth 29. The bell crank lever 38 is pressed toward the handle 35 of the lever, thereby throwing the dog 37 out of engagement with the teeth 28. The weight of the wagon will then cause the box to immediately assume its original position. If no other attachment were used, the box would descend quite rapidly, with a consequent danger of breaking. At the same time that the bell crank lever 48 is operated, the bell crank lever 41 is pressed toward the handle, thereby throwing the band brake 45 into engagement with the outer face of the ratchet wheel. Thus the speed with which the wagon box returns to its original position is entirely under the control of the operator through the medium of the band brake.

The bell crank levers being attached to the handle, they are all within the grasp of the operator's hand, whereby each lever, as well as the handle itself, is under direct control. The casting 22 is of simple design, and not liable to breakage. The hollow ratchet wheel 27 is also of simple and strong construction, and is covered by the casting 22. There is consequently little liability for disarrangement of any of the parts of the device. The system of bell crank levers, the ratchet dog, and the band brake are all secured to the hand lever, and are readily removable from the shaft and ratchet wheel, as stated above. It will thus be seen that by the use of my device the entire operation of elevating and depressing the wagon box is always under the control of the operator, so that the lifting or lowering may be accelerated, retarded or checked at any time desired.

My device can be readily attached to the ordinary wagon box by making slight changes therein, and the device does not in any sense detract from the strength or rigidity of the wagon when used in the ordinary manner.

While I have shown the guides and rack bar slightly curved, in order to accommodate the various positions of the axle swinging in the circumference of a great circle, it is evident that a straight rack bar would serve the same purpose, provided it was removably secured in place, the relative change in position necessary to accommodate itself to the circular movement of the axle being slight.

I claim:

1. In a dumping wagon, the combination with a frame, a wagon box, means for elevating one end of said box, and brake means adapted to travel with said end whereby said end may be lowered at any desired rate of speed.

2. In a dumping wagon, the combination with a frame, a wagon box, means for lifting one end of said box, and brake means adapted to travel with said end whereby said end may be lowered at any desired rate of speed, together with means for preventing the endwise displacement of said box.

3. In a dumping wagon, a frame, a pair of bolsters, a wagon box supported thereby, the front bolster being provided with oppositely disposed guides, and means traveling on said guides for raising said wagon box, together with brake means also carried by said guides for regulating the lowering thereof.

4. In a dumping wagon, a frame, a pair of bolsters, a wagon box supported thereby, the front bolster being provided with oppositely disposed guides, and means traveling on said guides for raising and lowering said wagon box, said means comprising a ratchet wheel and a series of levers and dogs for regulating the movement of said wheel.

5. In a dumping wagon, a frame, a pair of bolsters, a wagon box supported thereby, the front bolster having oppositely disposed guides extending close to the sides of said wagon box, provided with rack bars, and means traveling on said rack bars for raising said wagon box, together with brake means also carried by said guides for regulating the lowering thereof.

6. In a dumping wagon, a frame, a pair of bolsters, a wagon box supported thereby, the front bolster having oppositely disposed guides provided with rack bars extending upwardly adjacent to the sides of said wagon box, and means traveling on said rack bars for raising and lowering said wagon box, said means comprising a shaft on which said wagon box rests, pinions on said shaft adapted to work in said rack bars, and means for regulating the movement of said shaft in said rack bars.

7. In a dumping wagon, a frame, a pair of bolsters, a wagon box supported thereby, the front bolster having oppositely disposed guides provided with rack bars extending upwardly adjacent to the sides of said wagon box, and means traveling on said rack bars for raising and lowering said wagon box, said means comprising a shaft on which said wagon box rests, pinions on said shaft adapted to work in said rack bars, a ratchet wheel rigidly secured to said shaft, and a series of levers and dogs for regulating the movement of said ratchet wheel.

8. In a dumping wagon, a frame, a pair of bolsters, a wagon box supported thereby, the front bolster having oppositely disposed guides provided with curved rack bars extending upwardly adjacent to the sides of said wagon box, and means traveling on said rack bars for raising and lowering said wagon box, said means comprising a shaft on which said wagon box rests, pinions on said shaft adapted to work in said rack bars, a ratchet wheel rigidly secured to said shaft, and a series of levers and dogs for regulating the movement of said ratchet wheel.

9. In a dumping wagon, the combination with a wagon box, a front bolster including rack bars extending upwardly therefrom on either side of said wagon box, a shaft on which said wagon box rests, pinions secured to said shaft adapted to travel in said rack bars, a ratchet wheel rigidly secured to one end of said shaft, whereby said wagon box is raised and lowered, together with braking means whereby the downward movement of said wagon box may be regulated.

10. In a dumping wagon, the combination with a wagon box, a front bolster including rack bars extending upwardly therefrom on either side of said wagon box, a shaft on which said wagon box rests, pinions secured to said shaft adapted to travel in said rack bars, a ratchet wheel rigidly secured to one end of said shaft, whereby said wagon box is raised and lowered, together with a band brake whereby the downward movement of said wagon box may be regulated.

11. In a dumping wagon, the combination with a wagon box, a front bolster including rack bars extending upwardly therefrom on either side of said wagon box, a shaft on which said wagon box rests, pinions secured to said shaft adapted to travel in said rack bars, a ratchet wheel rigidly secured to one end of said shaft, whereby said wagon box is raised and lowered, together with a band brake surrounding said ratchet wheel whereby the downward movement of said wagon may be regulated.

12. In a dumping wagon, the combination with a wagon box, a shaft secured thereto, and means for raising and lowering same, said means comprising an internally and externally toothed ratchet wheel, and dogs or pawls adapted to engage the teeth of said ratchet wheel.

13. In a dumping wagon, the combination with a wagon box, a shaft secured thereto, means for raising and lowering same, said means comprising an internally and externally toothed ratchet wheel, and lever controlled dogs or pawls adapted to engage the teeth of said ratchet wheel.

14. In a dumping wagon, the combination with a wagon box, a shaft secured thereto, and means for raising and lowering same, said means comprising an internally and externally toothed ratchet wheel, and lever controlled dogs or pawls adapted to engage the teeth of said ratchet wheel, together with a lever controlled band brake surrounding said ratchet wheel.

15. In a device of the class described, the combination with a frame, upwardly extending guides including rack bars mounted on said frame, a shaft and pinions adapted to travel in said rack bars, and a wagon box mounted on said shaft, a casting loosely journaled on said shaft adapted to slidingly engage said guides, and an externally and internally toothed ratchet wheel rigidly secured to said shaft outside of said casting, means for securing said casting and ratchet wheel together, together with lever controlled means for operating said ratchet wheel.

16. In a device of the class described, the combination with a frame, upwardly extending guides including rack bars mounted on said frame, a shaft and pinions adapted to travel in said rack bars, a wagon box mounted on said shaft, a casting loosely journaled on said shaft adapted to slidingly engage said guides, and an externally and internally toothed ratchet wheel rigidly secured to said shaft outside of said casting, means for securing said casting and ratchet wheel together, a dog or pawl secured to the inner face of said casting adapted to engage the internal teeth of said ratchet wheel, and lever controlled means for operating said ratchet wheel.

17. In a device of the class described, the combination with a frame, upwardly extending guides including rack bars mounted on said frame, a shaft and pinions adapted to travel in said rack bars, a wagon box mounted on said shaft, a casting loosely journaled on said shaft adapted to slidingly engage said guides, and an externally and internally toothed ratchet wheel rigidly secured to said shaft outside of said casting, means for securing said casting and ratchet wheel together, a spring dog or pawl secured to the inner face of said casting adapted to engage the internal teeth of said ratchet wheel, and lever controlled means for operating said ratchet wheel.

18. In a device of the class described, the combination with a frame, upwardly extending guides including rack bars mounted on said frame, a shaft and pinions adapted to travel in said rack bars, a wagon box mounted on said shaft, a casting loosely journaled on said shaft adapted to slidingly engage said guides, and an externally and internally toothed ratchet wheel rigidly secured to said shaft outside of said casting, means for securing said casting and ratchet wheel together, a spring dog or pawl secured to the inner face of said casting adapted to engage the internal teeth of said ratchet wheel, and lever controlled means for operating said ratchet wheel, and means carried by said casting for throwing said spring dog into and out of engagement with said teeth.

19. In a device of the class described, the combination with a frame, upwardly extending guides including rack bars mounted on said frame, a shaft and pinions adapted to travel in said rack bars, a wagon box mounted on said shaft, a casting loosely journaled on said shaft adapted to slidingly engage said guides, an internally and externally toothed ratchet wheel rigidly secured to said shaft outside of said casting, means for securing said casting and ratchet wheel together, a spring dog pivotally secured to the casting adapted to engage the internal teeth of said ratchet wheel, and lever controlled means for operating said ratchet wheel, said means comprising a lever seated on the squared end of the pivot connecting said dog to the casting.

20. In a device of the class described, the combination with a frame, upwardly extending guides including rack bars mounted on said frame, a shaft and pinions adapted to travel in said rack bars, a wagon box mounted on said shaft, a casting loosely journaled on said shaft adapted to slidingly engage said guides, an internally and externally toothed ratchet wheel rigidly secured to said shaft outside of said casting, means for securing said casting and ratchet wheel together, a spring dog pivotally secured to the casting adapted to engage the internal teeth of said ratchet wheel, lever controlled means for operating said ratchet wheel, said means comprising a flanged lever seated on the squared end of the pivot securing said spring dog to the casting, and a lug or stop projecting outwardly from the face of said casting, adapted to engage the flange on said lever to hold said dog out of engagement with the teeth of the ratchet wheel.

21. In a device of the class described, the combination with a frame, upwardly extending guides including rack bars mounted on said frame, a shaft and pinions adapted to travel in said rack bars, a wagon box mounted on said shaft, a casting loosely journaled on said shaft adapted to slidingly engage said guides, said casting provided on its outer face with a pair of parallel lugs forming tracks therebetween within which the above described guides are adapted to travel.

22. In a device of the class described, the combination with a frame, upwardly extending guides including rack bars mounted on said frame, a shaft and pinions adapted to travel in said rack bars, and a wagon box mounted on said shaft, a casting loosely journaled on said shaft adapted to slidingly engage said guides, a pair of parallel lugs one on either side of the shaft, and shorter lugs having curved faces adjacent to and parallel with said first named lugs and forming between themselves and the first named lugs tracks within which the above described guides are adapted to travel.

23. In a dumping wagon, the combination with a wagon box, a pinioned shaft secured thereto, a frame, upwardly extending guides including rack bars mounted thereon, within which the pinions are adapted to travel, an internally and externally toothed gear wheel rigidly mounted on said shaft adjacent to the end thereof, a lever loosely journaled on the end of said shaft, and a lever controlled dog secured to said lever and adapted to be brought into and out of engagement with the external teeth of said ratchet wheel.

24. In a dumping wagon, the combination with a wagon box, a pinioned shaft secured thereto, a frame, upwardly extending guides including rack bars mounted thereon, within which the pinions are adapted to travel, an internally and externally toothed gear wheel rigidly mounted on said shaft adjacent to the end thereof, a lever loosely journaled on the end of said shaft, a lever controlled dog secured to said lever and adapted to be brought into and out of engagement with the external teeth of said ratchet wheel, and a lever controlled band brake also mounted on said lever whereby the downward movement of said wagon box may be regulated.

25. In a dumping wagon, the combination with a wagon box, a pinioned shaft secured thereto, a frame, upwardly extending guides including rack bars mounted thereon within which the pinions are adapted to travel, an internally and externally toothed gear wheel rigidly mounted on said shaft adjacent to the end thereof, a lever loosely journaled on the end of said shaft, a dog mounted on said lever, and a bell crank lever secured to said first named or main lever, adapted to throw said dog into and out of engagement with the teeth of said ratchet wheel.

26. In a dumping wagon, the combination with a wagon box, a pinioned shaft secured thereto, a frame, upwardly extending guides including rack bars mounted thereon, within which the pinions are adapted to travel, an internally and externally toothed gear wheel rigidly mounted on said shaft adjacent to the end thereof, a lever loosely journaled on the end of said shaft, a dog mounted on said lever, and a spring controlled bell crank lever secured to said first named or main lever, adapted to throw said dog into and out of engagement with the teeth of said ratchet wheel.

27. In a dumping wagon, the combination with a wagon box, a pinioned shaft secured thereto, a frame, upwardly extending guides including rack bars mounted thereon, within which the pinions are adapted to travel, an internally and externally toothed gear wheel rigidly mounted on said shaft adjacent to the end thereof, a lever loosely journaled on the end of said shaft, a dog mounted on said lever, a bell crank lever, and a spring connecting said bell crank lever mounted on said first mentioned lever, normally adapted to hold said dog in engagement with the external teeth of said ratchet wheel.

28. In a dumping wagon, the combination with a wagon box, a pinioned shaft secured thereto, a frame, upwardly extending guides including rack bars mounted thereon, within which the pinions are adapted to travel, an internally and externally toothed gear wheel rigidly mounted on said shaft adjacent to the end thereof, a lever loosely journaled on the end of said shaft, a band brake encircling said ratchet wheel, one end of which is rigidly secured to said lever, and a bell crank brake lever attached to the other end thereof, together with means for pressing said brake against the outer face of said ratchet wheel.

29. In a dumping wagon, the combination with a wagon box, a pinioned shaft secured thereto, a frame, upwardly extending guides including rack bars mounted thereon, within which the pinions are adapted to travel, an internally and externally toothed gear wheel rigidly mounted on said shaft adjacent to the end thereof, a lever loosely journaled on the end of said shaft, a band brake encircling said ratchet wheel, one end of which is rigidly secured to said lever, and a bell crank brake lever attached to the other end thereof, together with means for pressing said brake against the outer face of said ratchet wheel, said means comprising a spring controlled supplemental bell crank lever mounted on the main lever normally holding said band brake out of engagement with the outer face of the ratchet wheel.

30. In a dumping wagon, the combination with a wagon box, a pinioned shaft secured thereto, a frame, upwardly extending guides including rack bars mounted thereon, within which the pinions are adapted to travel, an internally and externally toothed gear wheel rigidly mounted on said shaft adjacent to the end thereof, a lever loosely journaled on the end of said shaft, a band brake encircling said ratchet wheel, one end of which is rigidly secured to said lever, a bell crank brake lever attached to the other end thereof, together with means for pressing said brake against the outer face of said ratchet wheel, said means comprising a supplemental band brake lever, together with a spring secured to said supplemental band brake and the main lever normally adapted to hold said band brake out of engagement with the toothed ratchet wheel.

31. An elevating machine for dumping wagons, comprising an internally and externally toothed ratchet wheel adapted to travel in guides on either side of the box of a dumping wagon, together with lever means for operating said ratchet wheel.

32. An elevating machine for dumping wagons, comprising an internally and externally toothed ratchet wheel adapted to travel in guides on either side of the box of a dumping wagon, a band brake adapted to engage said ratchet wheel, together with lever means for operating said ratchet wheel.

Signed by me at Coal City Ill., this 3rd day of Oct. 1907.

CHARLES H. VAN DEUSEN.

Witnesses:
   FRED VAN DEUSEN,
   B. O. MILL.